(12) United States Patent
Simmons et al.

(10) Patent No.: US 7,979,986 B2
(45) Date of Patent: Jul. 19, 2011

(54) METHOD FOR SECURING A CARTRIDGE MECHANICAL FACE SEAL TO A SLEEVE

(76) Inventors: L. Kimball Simmons, Williston, VT (US); Kevin D. Davis, Burlington, VT (US)

( * ) Notice: Subject to any disclaimer, the term of this patent is extended or adjusted under 35 U.S.C. 154(b) by 602 days.

(21) Appl. No.: 12/009,056

(22) Filed: Jan. 16, 2008

(65) Prior Publication Data
US 2008/0174073 A1   Jul. 24, 2008

(51) Int. Cl.
*B21D 39/00* (2006.01)
*F16J 15/00* (2006.01)

(52) U.S. Cl. ....... 29/888.3; 29/521; 29/525.02; 277/306
(58) Field of Classification Search .............. 29/888.3, 29/521, 525.02; 277/306, 307
See application file for complete search history.

(56) References Cited

U.S. PATENT DOCUMENTS
4,225,294 A * 9/1980 Kakuwa et al. ............... 418/142
5,762,342 A * 6/1998 Kakabaker et al. ........... 277/306
* cited by examiner

*Primary Examiner* — Jermie E Cozart
(74) *Attorney, Agent, or Firm* — John W. O'Donnell, Esq.

(57) ABSTRACT

This method for securing a cartridge mechanical face seal to a sleeve in a rotating shaft sealing assembly uses one or more plunger locks to secure the rotary face of the seal assembly to the sleeve. Such seal assemblies have been previously secured with set screws. This plunger lock method for securing the rotary face of the cartridge seal avoids the use of set screws altogether. Instead, one or more spring activated plunger locks located in the rotary face seal assembly are mated into precisely located receptacle bores in the sleeve. The resulting attachment will not leak, require additional tightening, or distort the sleeve.

3 Claims, 5 Drawing Sheets

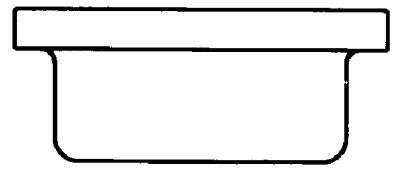
FIGURE 4b SEAL ASSEMBLY PLUNGER LOCK
SIDE VIEW
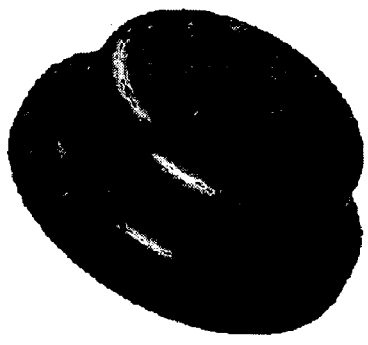
FIGURE 4c SEAL ASSEMBLY PLUNGER LOCK
OBLIQUE VIEW
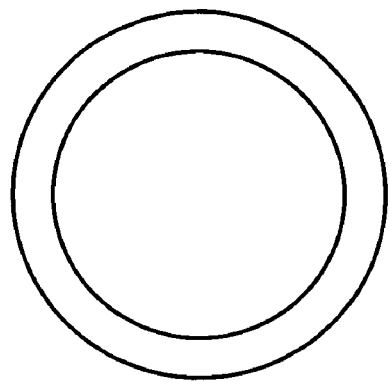
FIGURE 4a SEAL ASSEMBLY PLUNGER LOCK
FRONTAL VIEW
FIGURE 4.

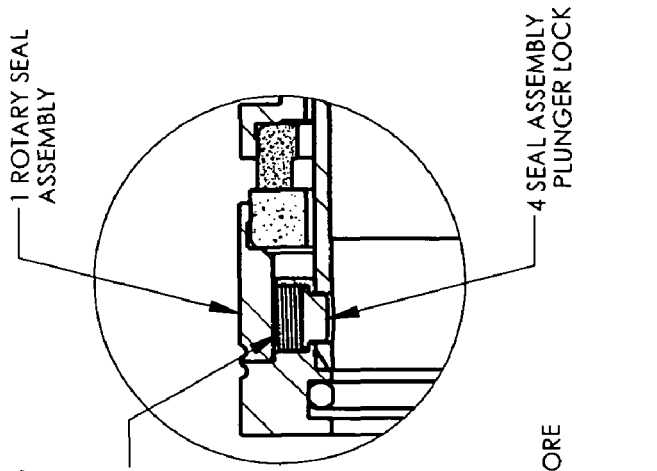
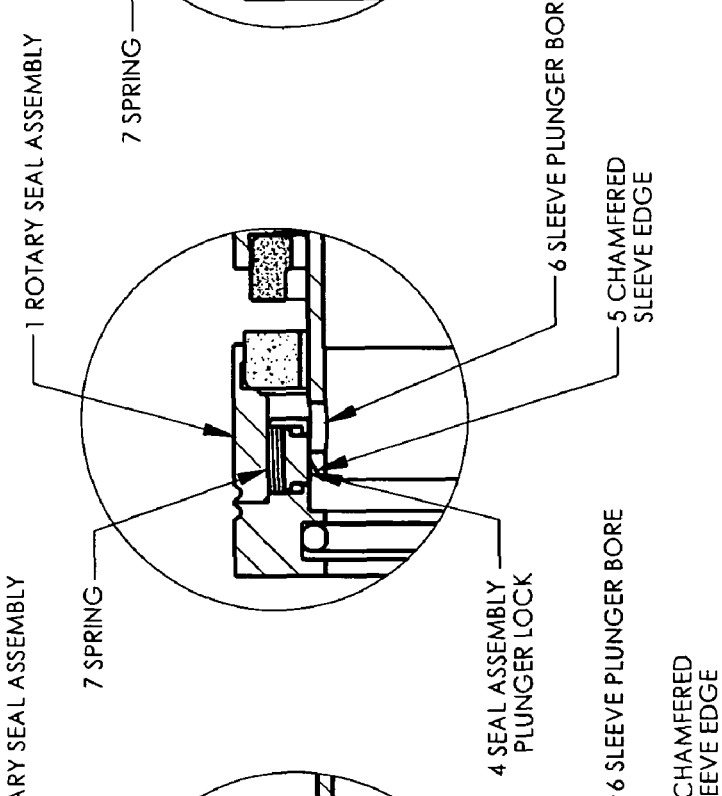
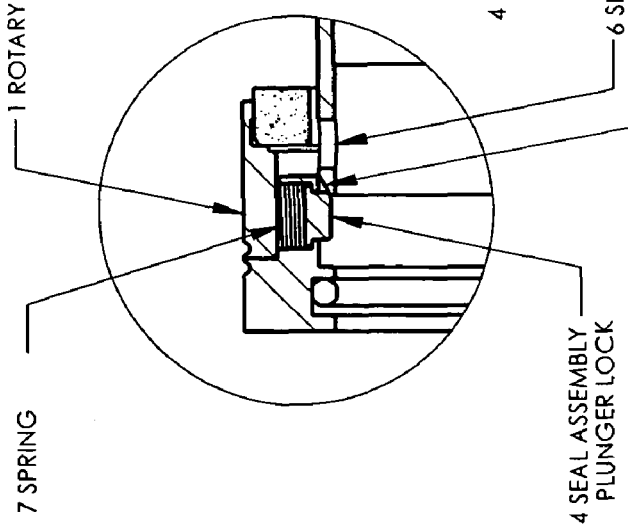

METHOD FOR SECURING A CARTRIDGE MECHANICAL FACE SEAL TO A SLEEVE

CROSS REFERENCE TO RELATED APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

INCORPORATION-BY-REFERENCE MATERIAL ON A COMPACT DISC

Not applicable.

BACKGROUND OF THE INVENTION

The use of a unitized cartridge mechanical face seal assembly for a rotating shaft sealing system is now well known in the industry. American Petroleum Institute Standard 682 defines a cartridge seal as a "complete self contained unit (including seal faces, flexible elements, seal gland plate, sleeve and mating ring) which is pre-assembled and preset before installation". The cartridge assembly eliminates the handling of many precision machined parts, measuring, and aligning the seal assembly to a rotating shaft inside the seal assembly housing. The difficulty of coordination and performance of these steps had been one of the leading causes for premature seal failure.

All cartridge seal designs have a sleeve that affixes to the rotating shaft. This sleeve, concentric to the rotating shaft, holds the rotary seal assembly in the correct operating position, and transmits torque to the rotary face.

Cup point set screws are routinely used to secure the rotary face assembly to the sleeve. Because of the inherent design, the use of set screws to secure the rotary face leads to a number of problems including leakage, sleeve distortion, vibration damage, and complete seal failure.

SUMMARY OF THE INVENTION

This method for securing the rotary face assembly of the cartridge seal avoids the use of set screws altogether. Instead, one or more spring activated plunger locks located in the rotary face assembly are mated into precisely located and sized receptacle bores in the sleeve. The resulting attachment will not leak, require additional tightening, or distort the sleeve. This method of attachment also results in a better transfer of torque from the sleeve the rotary face.

Kakuwa (U.S. Pat. No. 4,225,294) disclosed an oil seal with a sealing lip which provides improved wear resistance of the oil seal for the side housing of a rotary piston engine. Kakabaker (U.S. Pat. No. 5,762,342) disclosed a mechanical seal assembly for creating a sealing relationship between a housing and a shaft, said assembly including a controller for regulating face contact pressure. Neither addressed the method for securing a mechanical seal assembly to the shaft itself.

In this embodiment, the rotary face assembly is fabricated with two (2) diametrically opposed spring activated plunger locks. The spring urges the plunger locks into the extended locked position. The accompanying sleeve is fabricated with precisely sized bores at proper positions to receive the plunger locks. The sleeve is also fabricated with a chamfered outside edge over which the rotary face assembly will slide to sit tightly and concentrically.

The rotary face assembly is secured to the sleeve by sliding the seal assembly onto the sleeve. The chamfered outside edge of the sleeve depresses the plunger locks into the retracted position. The seal assembly is then adjusted into position so that the plunger locks are positioned over the sleeve bores. As the plunger locks position over the sleeve bores, the plunger locks are spring activated into a return to the extended locked position, mating into the sleeve bores and precisely securing the rotary face of the seal assembly to the sleeve.

Because the plunger locks are spring activated, and because the sleeve bores extend through the sleeve surface, this method of attachment also allows the manual return of the plungers to the retracted position and the easy disassembly of the rotary seal assembly after the cartridge seal has been removed from the rotating shaft. The cartridge seal assembly can then be more easily repaired.

This description of the method is its preferred embodiment, but the disclosure is not intended to be limiting. Various alterations and modifications will be apparent to those skilled in the art.

DESCRIPTION OF THE SEVERAL VIEWS OF THE DRAWINGS

FIG. 4 shows the frontal, FIG. 4a, cross section, FIG. 4b, and oblique, FIG. 4c, views of the seal assembly plunger lock (4).

FIG. 5 shows the operation of the seal assembly plunger lock (4) during the securing of the rotary seal assembly (1) to the sleeve (2). FIG. 5a shows the rotary seal assembly (1) with the plunger lock (4) in the extended position before sliding onto the sleeve (2). FIG. 5b shows the chamfered edge of the sleeve (5) urging the seal assembly plunger lock (4) into the retracted position. FIG. 5c shows the rotary seal assembly (1) secured to the sleeve (2) with the plunger lock (4) in the sleeve bore (6) in the extended locked position.

Figure 1:
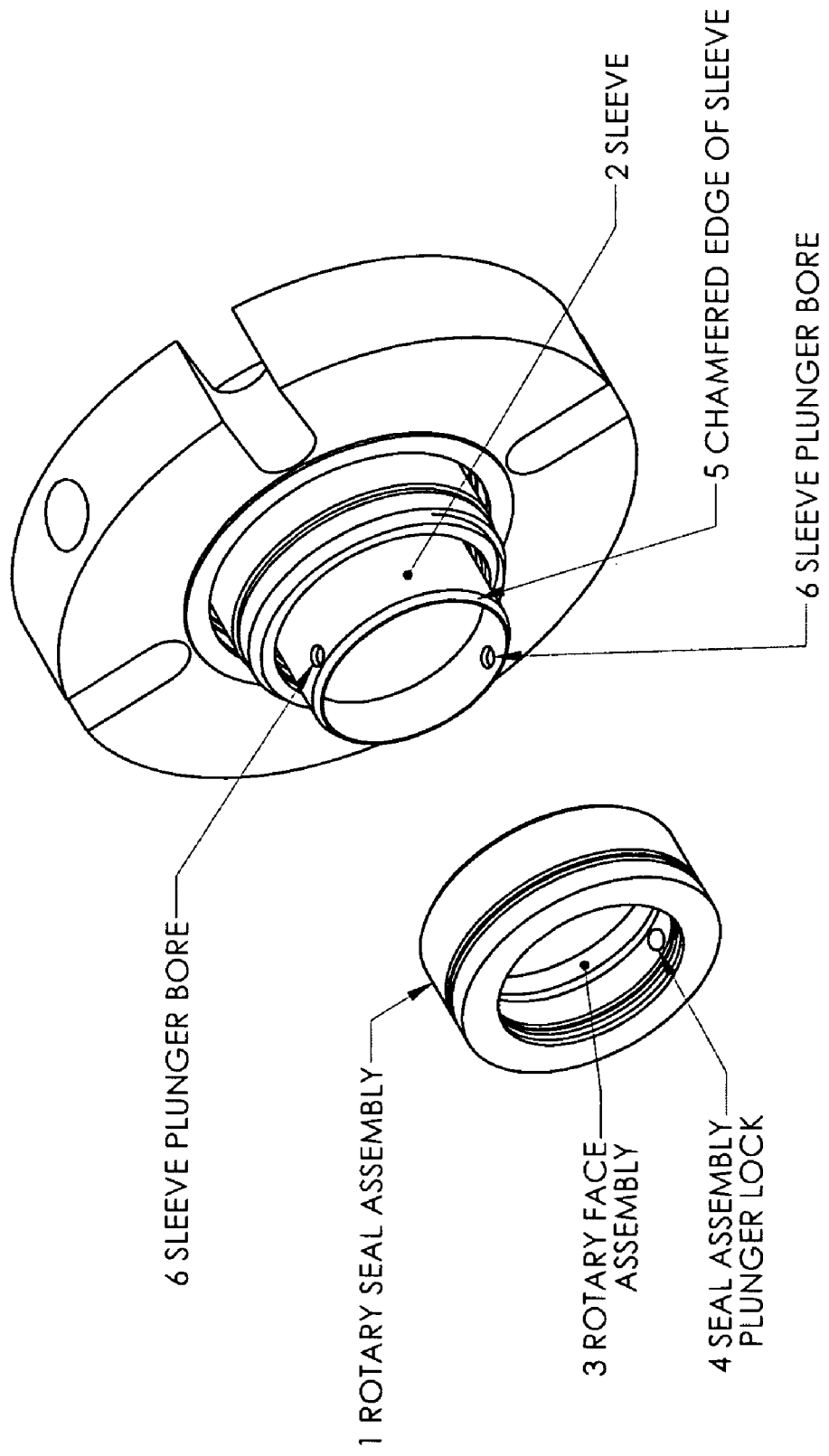
FIG. 1 shows the two components for the method of securing the rotary seal assembly (1) to the sleeve (2). In the drawing of this embodiment, the rotary face of the seal assembly (3) shows one of the two seal assembly plunger locks (4). The sleeve (2) has a chamfered outside edge (5) and two sleeve bores (6).
Figure 2:
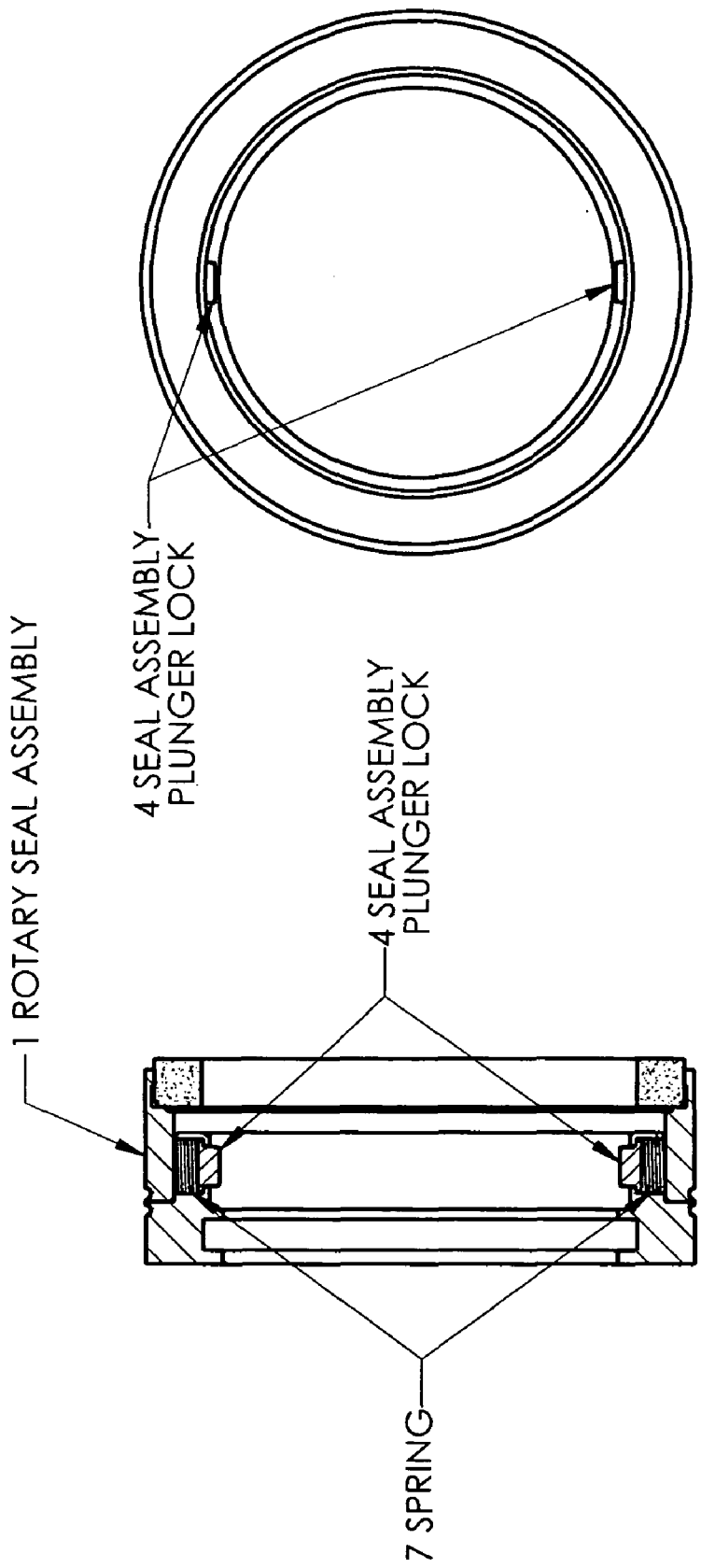
FIG. 2 shows the cross-section, FIG. 2a, and the frontal view, FIG. 2b, of the rotary seal assembly (1). The figures show the rotary seal assembly (1) secured to the sleeve (2) with the spring (7) activated seal assembly plunger lock (4) in the extended locked position.
Figure 3:
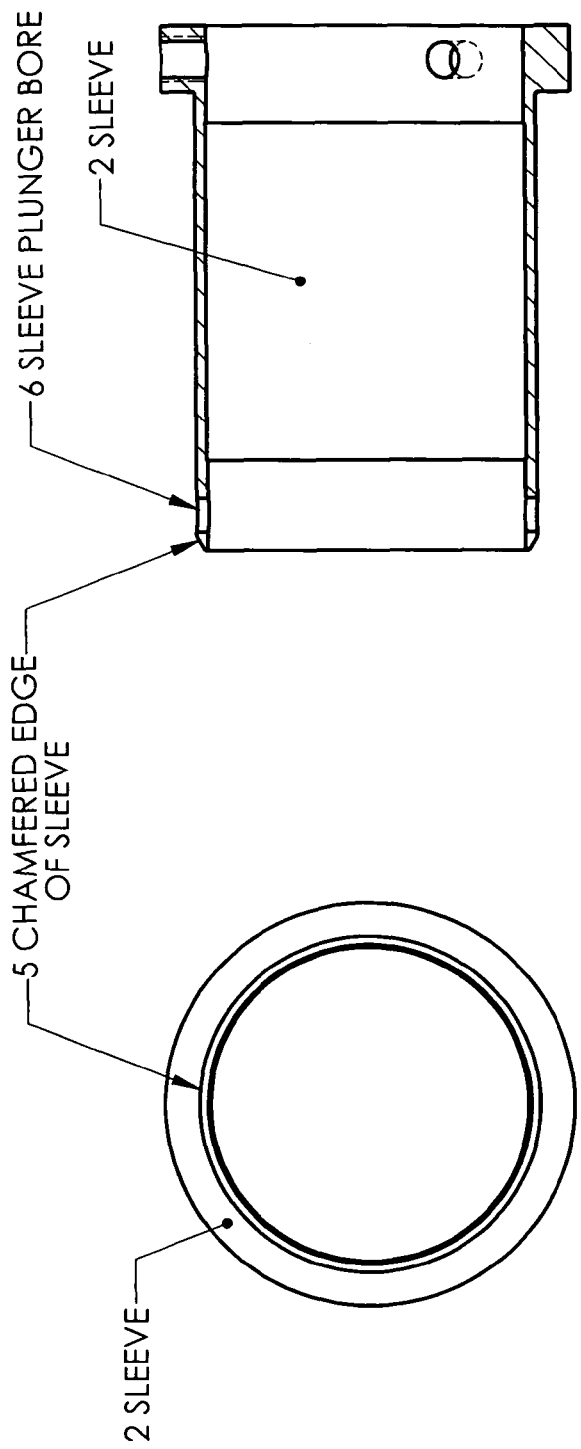
FIG. 3 shows the frontal view, FIG. 3a, and the cross section, FIG. 3b, of the sleeve (2), with the chamfered edge of the sleeve (5) and the sleeve bores (6).

We claim:

1. A method for securing a cartridge mechanical face seal assembly to a sleeve, comprising
    fabricating a cartridge mechanical face seal assembly with a rotary seal assembly including a rotary face to couple with a sleeve, said seal assembly having a bore, said bore perpendicular to a sleeve surface, a plunger disposed in said bore, a spring in said bore between said seal assembly and said plunger, thereby forming a loosely coupled mechanism, said loosely coupled mechanism being axially movable relative to said seal assembly, said loosely coupled mechanism having spring activated means for a plunger retracted position and spring activated means for said spring resiliently urging said plunger into an extended locked position;

fabricating said sleeve for the cartridge mechanical face seal assembly, said sleeve having a bore of the same shape of said bore in said seal assembly, said bore in said sleeve extending completely through said sleeve, said sleeve bore being of a size to accept tightly said seal assembly plunger in said extended locked position, and said sleeve having a chamfered edge on the outside circumference of a leading edge of said sleeve;

sliding said seal assembly onto said sleeve so that said chamfered edge of said sleeve urges said seal assembly plunger into the retracted position;

positioning said seal assembly on said sleeve so that said seal assembly bore with retracted plunger is located coincident with said sleeve bore; and adjusting said cartridge mechanical face seal assembly so that said loosely coupled mechanism spring extends said plunger into the extended locked position in said sleeve bore.

2. A method for securing a cartridge mechanical face seal assembly to a sleeve described in claim 1, where securing said cartridge mechanical face seal assembly to said sleeve is achieved using a plurality of plungers into an equal number of sleeve bores.

3. A method for securing a cartridge mechanical face seal assembly to a sleeve described in claim 1, where the securing of a cartridge mechanical face seal assembly with a plurality of seal components is achieved using a plurality of plungers into an equal number of sleeve bores.

* * * * *